US012468475B2

(12) United States Patent
Tsuchiya

(10) Patent No.: US 12,468,475 B2
(45) Date of Patent: Nov. 11, 2025

(54) STORAGE AWARE APPLICATION SCHEDULING

(71) Applicant: HITACHI VANTARA, LTD., Yokohama (JP)

(72) Inventor: Akiyoshi Tsuchiya, San Jose, CA (US)

(73) Assignee: HITACHI VANTARA, LTD., Yokohama (JP)

( * ) Notice: Subject to any disclaimer, the term of this patent is extended or adjusted under 35 U.S.C. 154(b) by 307 days.

(21) Appl. No.: 18/102,034

(22) Filed: Jan. 26, 2023

(65) Prior Publication Data

US 2024/0256170 A1  Aug. 1, 2024

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
See application file for complete search history.

(56) References Cited

U.S. PATENT DOCUMENTS

| | | | | |
|---|---|---|---|---|
| 7,805,583 | B1* | 9/2010 | Todd | G06F 3/0647 |
| | | | | 711/161 |
| 8,291,412 | B2* | 10/2012 | Sekiguchi | G06F 9/45558 |
| | | | | 718/1 |
| 9,079,562 | B2* | 7/2015 | Bert | G06F 11/2033 |
| 9,229,656 | B1* | 1/2016 | Contreras | G06F 3/067 |
| 10,114,691 | B2 | 10/2018 | Johri et al. | |
| 2011/0078494 | A1* | 3/2011 | Maki | G06F 11/2028 |
| | | | | 711/E12.001 |
| 2014/0244718 | A1* | 8/2014 | Das | G06F 11/202 |
| | | | | 709/203 |
| 2016/0371007 | A1* | 12/2016 | Shani | G06F 11/1464 |
| 2021/0382788 | A1 | 12/2021 | Chiba et al. | |

OTHER PUBLICATIONS

Su, Yong, et al. "Data location mechanism in agent-based autonomic storage systems." Wuhan University Journal of Natural Sciences 12.2 (2007): 249-254. (Year: 2007).*
Tian, Chen, et al. "Improving application placement for cluster-based web applications." IEEE Transactions on Network and Service Management 8.2 (2011): 104-115. (Year: 2011).*
Kubernetes. Assigning Pods to Nodes. https://kubernetes.io/docs/concepts/scheduling-eviction/assign-pod-node/ Accessed on Jan. 26, 2023. Last modified on Nov. 29, 2022.

* cited by examiner

*Primary Examiner* — Nicholas J Simonetti
(74) *Attorney, Agent, or Firm* — PROCOPIO, CORY, HARGREAVES & SAVITCH LLP

(57) ABSTRACT

A method for application placement management. The method comprising identifying, by a storage agent, a first server from a plurality of servers or a first cluster from a plurality of clusters, the first server or the first cluster can access a first volume through which an application can be executed; identifying, by the storage agent, data associated with the application, wherein the data is stored in the first volume; identifying, by the storage agent, a group of servers from the plurality of servers or a group of clusters from the plurality of clusters having access to the data; updating, by the storage agent, data accessibility associated with each server of the group of servers or each cluster of the group of clusters; and notifying, by the storage agent, the updated data accessibility associated with each server of the group of servers or each cluster of the group of clusters.

21 Claims, 11 Drawing Sheets

| App ID | Required Rule |
|---|---|
| App1 | App1 is included in "Data Accessibility" |
| App2 | App2 is included in "Data Accessibility" |
| App3 | App3 is included in "Data Accessibility" |

| Cluster ID | Location | URL | Data Accessibility |
|---|---|---|---|
| Cluster1 | Region 1 | http://cluster1.region1.xyz.com | App1 |
| Cluster2 | Region 2 | http://cluster2.region2.xyz.com | App1, App2 |
| Cluster3 | Region 3 | http://cluster3.region3.xyz.com | App3 |
| Cluster4 | Region 3 | http://cluster4.region4.xyz.com | App3 |

| Server ID | Cluster ID | Location | Data Accessibility |
|---|---|---|---|
| Server1 | Cluster1 | Zone 1 | |
| Server2 | Cluster1 | Zone 1 | |
| Server3 | Cluster1 | Zone 2 | App1 |
| Server4 | Cluster1 | Zone 2 | App1 |
| Server5 | Cluster2 | Zone 3 | App1, App2 |
| Server6 | Cluster2 | Zone 3 | App1, App2 |
| Server7 | Cluster2 | Zone 4 | |
| Server8 | Cluster2 | Zone 4 | |
| Server9 | Cluster3 | Zone 5 | App3 |
| Server10 | Cluster3 | Zone 5 | App3 |
| Server11 | Cluster4 | Zone 6 | App3 |
| Server12 | Cluster4 | Zone 6 | App3 |

FIG. 4

| App ID | Image URL | Volume ID | Placement | |
|---|---|---|---|---|
| | | | Cluster | Server |
| App1 | abc.com/app1 | Vol1 | Cluster1 | Server3 |
| App2 | abc.com/app2 | Vol4 | Cluster2 | Server5 |
| App3 | xyz.com/app3 | Vol6 | Cluster4 | Server10 |

FIG. 5

| Storage ID | Location | | Accessible from | |
|---|---|---|---|---|
| | Region | Zone | Region | Zone |
| Storage1 | 1 | 1 | 1 | 1 |
| Storage2 | 1 | 2 | 1 | 2 |
| Storage3 | 2 | 3 | 2 | 3 |
| Storage4 | 2 | 4 | 2 | 4 |
| Storage3 | 3 | 5 | 3 | 5, 6 |
| Storage4 | 3 | 6 | 3 | 6, 6 |

FIG. 6

| Volume ID | Size | Storage ID |
|---|---|---|
| Vol1 | 10 TB | Storage1 |
| Vol2 | 10 TB | Storage2 |
| Vol3 | 10 TB | Storage3 |
| Vol4 | 5 TB | Storage1 |
| Vol5 | 5 TB | Storage3 |
| Vol6 | 20 TB | Storage4 |

FIG. 7

| Source | | Destination | | Method | Status |
|---|---|---|---|---|---|
| ID | Owner | ID | Owner | | |
| Vol1 | Storage1 | Vol2 | Storage2 | Sync | Suspended due to Failure |
| Vol2 | Storage2 | Vol3 | Storage3 | Async | Synced |
| Vol4 | Storage1 | Vol5 | Storage4 | Async | Syncing |

FIG. 8

STORAGE AWARE APPLICATION SCHEDULING

BACKGROUND

Field

The present disclosure is generally directed to a method and a system of application placement management, and more specifically, to a method of storage aware application scheduling for the automation of maintenance and recovery.

Related Art

Cloud native approach has been widely adapted to improve operational agility of applications. One of the most important points of the cloud native approach is the ability to automate operations. By this automaton, manual operations which have large time overhead can be drastically reduced. In addition, the automation enables application operators to use IT infrastructure such as servers, networks and storages, in a self-service manner without expertise. The self-service manner can eliminate communication overhead between application operators and IT infrastructure administrators. The approach started solely for stateless applications but has been applied to stateful applications.

In addition to agility, stability of applications is also important for critical applications which are used to conduct important business. Downtime of critical applications can lead to significant economic losses. Therefore, it is desirable to keep downtime to a minimal. Both maintenance for failure prevention and quick recovery from failure are essential in reducing downtime. Maintenance is the operation for maintaining healthiness of system and preventing failure, and can be used to improve Mean Time Between Failure (MTBF). On the other hand, quick recovery serves to reduce Mean Time to Recovery (MTTR).

Maintenance and recovery for stateful applications require storage aware scheduling to make applications accessible to data used by the application, and often require restarting the applications. For maintenance, restarting application at upgrading platform such as an operating system (OS) and application orchestrator are required when restarting a newer version of the application. For recovery, when the hardware operating the application fails, it is necessary to restart the application on a separate hardware that is not impacted by this failure. When restarting stateful applications, the stateful applications is required to be placed in cluster and server which have access to the volume having data used by the stateful application.

In the related art, a method for cloud native application platform applies affinity feature to enable users to configure scheduling rule. Affinity is a feature that allows the user to specify the server to run the application or to give conditions for selecting the server. By defining rules to ensure that applications are placed on servers or clusters that have access to the data, applications can maintain access to the data even after restart of applications. In order to use the affinity feature so that applications can maintain access to the volume, users need to understand the storage configuration and status, and manage the rules accordingly. In addition, every time the configuration or status changes, the rules need to be changed by the users themselves. This degrades agility due to complicated and manual operation.

In the related art, a detection method exists for automatic detection of storage failure. The method detects failure in storages by mutually checking the status using Quorum between the storages constituting the volume replication. However, the method does not disclose application scheduling in response to detection of storage failure.

SUMMARY

Aspects of the present disclosure involve an innovative method for application placement management. The method may include identifying, by a storage agent, a first server from a plurality of servers or a first cluster from a plurality of clusters, the first server or the first cluster can access a first volume through which an application can be executed; identifying, by the storage agent, data associated with the application, wherein the data is stored in the first volume; identifying, by the storage agent, a group of servers from the plurality of servers or a group of clusters from the plurality of clusters having access to the data; updating, by the storage agent, data accessibility associated with each server of the group of servers or each cluster of the group of clusters, and notifying, by the storage agent, the updated data accessibility associated with each server of the group of servers or each cluster of the group of clusters.

Aspects of the present disclosure involve an innovative non-transitory computer readable medium, storing instructions for application placement management data. The instructions may include identifying, by a storage agent, a first server from a plurality of servers or a first cluster from a plurality of clusters, the first server or the first cluster can access a first volume through which an application can be executed; identifying, by the storage agent, data associated with the application, wherein the data is stored in the first volume; identifying, by the storage agent, a group of servers from the plurality of servers or a group of clusters from the plurality of clusters having access to the data; updating, by the storage agent, data accessibility associated with each server of the group of servers or each cluster of the group of clusters; and notifying, by the storage agent, the updated data accessibility associated with each server of the group of servers or each cluster of the group of clusters.

Aspects of the present disclosure involve an innovative server system for application placement management. The server system may include identifying, by a storage agent, a first server from a plurality of servers or a first cluster from a plurality of clusters, the first server or the first cluster can access a first volume through which an application can be executed; identifying, by the storage agent, data associated with the application, wherein the data is stored in the first volume; identifying, by the storage agent, a group of servers from the plurality of servers or a group of clusters from the plurality of clusters having access to the data; updating, by the storage agent, data accessibility associated with each server of the group of servers or each cluster of the group of clusters; and notifying, by the storage agent, the updated data accessibility associated with each server of the group of servers or each cluster of the group of clusters.

Aspects of the present disclosure involve an innovative system for application placement management. The system can include means for identifying, by a storage agent, a first server from a plurality of servers or a first cluster from a plurality of clusters, the first server or the first cluster can access a first volume through which an application can be executed, means for identifying, by the storage agent, data associated with the application, wherein the data is stored in the first volume; means for identifying, by the storage agent, a group of servers from the plurality of servers or a group of clusters from the plurality of clusters having access to the data; means for updating, by the storage agent, data accessibility associated with each server of the group of servers or each cluster of the group of clusters; and means for notifying, by the storage agent, the updated data accessibility associated with each server of the group of servers or each cluster of the group of clusters.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 2 illustrates an example application placement rule table, in accordance with example implementations.

FIG. 3 illustrates an example cluster management table, in accordance with example implementations.

FIG. 4 illustrates an example server management table, in accordance with example implementations.

FIG. 5 illustrates an example application management table, in accordance with example implementations.

FIG. 6 illustrates an example storage management table, in accordance with example implementations.

FIG. 7 illustrates an example volume management table, in accordance with example implementations.

FIG. 8 illustrates an example copy management table, in accordance with example implementations.

DETAILED DESCRIPTION

Figure 1:
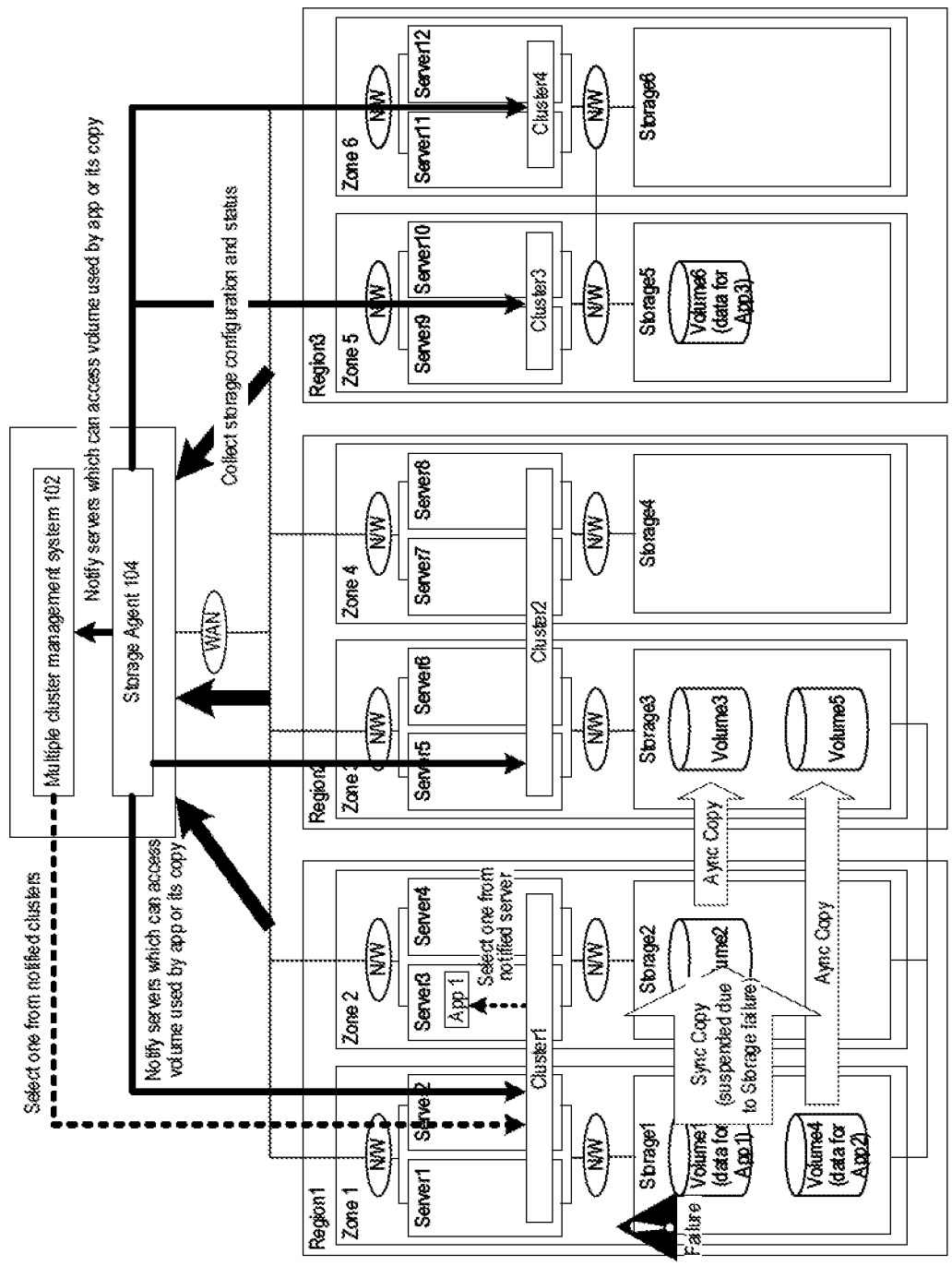
FIG. 1 illustrates an example system of a first embodiment, in accordance with example implementations.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example system of the first embodiment, in accordance with example implementations. As illustrates in FIG. 1, the system operates with a number of regions, zones, and servers. Regions are groups of zones classified based on their geographical location such as United States, European Union, Japan, and etc. Zones, also known as availability zones, fault domains, or fault sets, are groups of information technology (IT) devices and instances classified based on the location. IT devices and instances in the same zone typically belong to the same network group and power supply. Typical examples of zone are data centers and floors of data center.

Servers are IT devices or instances which have computing capability that are installed into zones. Examples of servers include computer hardware, virtual machines, laptops, or other devices having computing capability and capable of running applications. Servers are connected via networks and can communicate with each other. Servers spread across zones and regions are connected via networks (e.g., the Internet, local area network, wide area network, a telephonic network, a cellular network, satellite network, and etc.)

A plurality of servers works jointly to form a single cluster. Clustering software is used to manage a cluster and run applications on the cluster. Example clustering software include Kubernetes, OpenShift, VMware, and etc. A cluster and the clustering software used to implement the cluster are collectively referred to as a cluster.

To manage a plurality of clusters built across a number of zones and regions, a multiple cluster management system 102 is used. The multiple cluster management system 102 operates from a network connected location. An example of the connected location is a region chosen from the regions. In some example implementations, the multiple cluster management system 102 is provided as a cloud service.

Storages are installed in zones to store data of application operating on clusters. Typically, a storage is built within a single zone. However, it is not limited to this and may be built as a storage cluster across multiple zones in the case of scale-out storage. Storages and servers are connected via networks such as fiber channel (FC), internet small computer systems interface (iSCSI), peripheral component interconnect (PCI), peripheral component interconnect express (PCIe), and etc. A network for a storage may be connected between zones so that servers can access storage belonging to different zones. Storage can be any device capable of storing data, such as SSDs, HDDs, a storage device built into a server, an array system that consolidates multiple storage devices, SDS (Software Defined Storage) running on the server, or a storage service provided by a cloud service. FIG. 1 illustrates an example implementation in which storages and servers are connected via networks. In some example implementations, the storage can also be an HCI (Hyper Converged Infrastructure) where the SDS runs on the server and the application and storage are mixed in the server. In some example implementations, a storage is installed across zones by scale-out storage consisting of multiple devices, and instances may be deployed across zones.

Volumes are created in a storage in order to store application data running on a cluster. To increase data availability, volume can be replicated to other storages located in different zones and regions. Data replication methods include sync (synchronous) copying and async (asynchronous) copying. Sync copying enables data replication without data loss, but is not suitable for copying between distant locations as communication latency for data copying has large impact on I/O performance. Async copying can be used for copying between distant locations as the communication latency for data copying has small impact on I/O performance, but is not able to provide zero recovery point objective (RPO).

When users want applications to run, users make requests to the multiple cluster management system 102 to deploy the applications. In response to a request, application scheduler feature of the multiple cluster management system 102 selects a cluster on which the application is deployed. After the selection, the multiple cluster management system 102 deploys the application onto the selected cluster. In response to the deployment, application scheduler of the cluster selects a server on which the application is to run.

A storage agent 104 notifies the application scheduler of the multiple cluster management system 102 as to which of the clusters can access volumes having application data, so that the application scheduler can select the cluster where the application can access data of the application. In addition, the storage agent 104 notifies the application scheduler of the cluster as to which of the servers can access volumes having data application data, so that the application scheduler can select the server where the application can access data of the application.

For example, if volumes possessing the application data is configured to be copied to another storage, the storage agent 104 considers the copy source volume as well as the copy destination volume, and notifies each application scheduler of clusters or servers which can access either of them. If the volume has multiple copy relation such as cascade and fan-out configuration, the storage agent 104 considers all volumes related to the volumes used by application and notifies each application scheduler of clusters or servers which can access one of them.

When failure occurs on a storage, the storage agent 104 determines the storage as unavailable storage and notifies each application scheduler which clusters or servers can access data used by the application. For example, if a volume having data used by an application is configured to be copied to another volume on another storage and the storage having the copy source volume fails, the storage agent 104 notifies the application schedulers of the servers or clusters which can access the copy destination volume.

FIGS. 2-5 illustrate information that are managed by the multiple cluster management system 102 or a clustering software, and can be managed at a single location or be distributed. An example of distributed management of this information is that information about a cluster is managed by the cluster, and information across clusters is managed by the multiple cluster management system 102. The storage agent 104 uses this information to determine which clusters and servers can access volumes having data used by an application. The information may be retrieved by the storage agent 104 storages, the multiple cluster management system 102, or the clustering software.

In addition, the storage agent 104 requests the multiple cluster management system 102 and cluster to update information to notify which clusters and servers can access volumes used by an application. As a method of maintaining this information, a database that can be commonly accessed by components can be configured and information can be stored in it, thereby sharing information among the components.

FIGS. 6-8 illustrate information about storages, which are maintained by the storages. To execute an application which uses a volume, multiple cluster management system 102 and clustering software require access to the storage information. Storage agent 104 may also use this information to determine which clusters and servers can access the volumes. Storage agent 104 can retrieve this information from storages, multiple cluster management system 102 or clusters. In addition, the storage agent 104 can maintain a copy of the information in order to improve the performance of information access.

FIG. 2 illustrates an example application placement rule table 200, in accordance with example implementations. This table is managed by the multiple cluster management system 102 and cluster to application scheduling. Each entry in the application placement rule table 200 is associated with a specific application. The application placement rule table 200 stores information involving application ID (App ID) and required rule associated with the application.

App ID is an identifier of the application. Required rule is a mandatory condition when selecting a server or cluster. The storage agent adds rules for "data availability" as a required rule and fills out data accessibility field of server management table of FIG. 4 and cluster management table of FIG. 3. With the information, the multiple cluster management system 102 selects clusters from those that satisfy required rules for data accessibility. In addition, with the information, the cluster selects servers from those that satisfy required rule for data accessibility.

FIG. 3 illustrates an example cluster management table 300, in accordance with example implementations. As with the application placement rule table 200, the cluster management table 300 is also managed by the multiple cluster management system 102. The cluster management table 300 stores information involving cluster ID, location information, URL (Uniform Resource Locator), and data accessibility. The cluster ID is identifier information associated with the clusters, and every entry in the cluster management table 300 is associated with a specific cluster.

Location information identifies the region or zone where the cluster exists. In the case of a cluster that spans across multiple regions or zones, multiple values corresponding to locations of regions or zones can exist under location information. In the case of a clusters that is built across all zones in a region, zone specification may be omitted.

URL is access information to the cluster. The storage agent uses this information to receive and modify information managed by the cluster. Data accessibility is a field that indicates if the application's data is accessible or not. For example, if data accessibility includes App1, it indicates that the cluster can access data used by App1. This information is determined based on volume placement, storage configuration, and status, and added to the cluster management table 300 by the storage agent.

The application scheduler of the multiple cluster management system 102 selects a cluster out of existing clusters according to the required rule of the application placement rule table 200 and the data accessibility field of the cluster management table 300 when application is required to be restarted. Specifically, one of the clusters that satisfy the required rule for the target application is selected by referring to the data accessibility field in the cluster management table 300. The data accessibility information of the cluster management table 300 is updated based on the determination that the data used by the application in question is accessible through the process shown in FIGS. 9 and 11. Therefore, the cluster selected based on the data accessibility information of the cluster management table 300 and the required rule of the application in question is guaranteed to be able to access the volume, and the application can access the volume on the selected cluster and execute its processing with the data stored in the volume.

FIG. 4 illustrates an example server management table 400, in accordance with example implementations. This server management table 400 is managed by each cluster. Server ID is an identifier of the server. Cluster ID is an identifier of the cluster to which the server belongs. Location is information that indicates where the server exists. An example of how to uniquely identify a location is by using an ID of a region or a zone. If a zone ID is unique across multiple regions, specification of a region in association with the zone for specifying location can be omitted. Data accessibility indicates if each application's data is accessible or not. For example, if data accessibility includes App1, it indicates that the server can access App1's data.

The application scheduler of the cluster selects a server out of existing servers belonging to the cluster according to the required rule of the application placement rule table 200 and the data accessibility field of the server management table 400 when application is required to be restarted. Specifically, one of the servers that satisfy the required rule for the target application is selected by referring to the data accessibility field in the cluster management table 400. The data accessibility information of the server management table 400 is updated based on the determination that the data used by the application in question is accessible through the process shown in FIGS. 9 and 11. Therefore, the server selected based on the data accessibility information of the server management table 400 and the required rule of the application in question is guaranteed to be able to access the volume, and the application can access the volume on the selected server and execute its processing with the data stored in the volume.

FIG. 5 illustrates an example application management table 500, in accordance with example implementations. The application management table 500 is managed by the multiple cluster management system 102 and cluster to manage application. The application management table 500 stores information involving App ID, Image URL, volume ID, and placement information. The App ID is identifier information associated with the applications, and every entry in the application management table 500 is associated with a specific application.

Image URL is information that indicates where the image implementing the application should be retrieved from when launching the application. An image is an application format, typically packaged in a container format. In some example implementations, the image is packaged as VM image.

Volume ID identifies volumes of which the application uses. If an application uses multiple volumes, then Volume ID associated with the application identifies the IDs of the multiple identified volumes. Placement information indicates the location where the application is placed. When application scheduler of the multiple cluster management system 102 and cluster decide on which cluster and server to run the application, the application schedulers complete this field for the corresponding application.

FIG. 6 illustrates an example storage management table 600, in accordance with example implementations. The storage management table 600 stores information involving storage ID, location, and information where storage corresponding to an entry can be accessible from. The storage ID is identifier information associated with the storages, and every entry in the storage management table 600 is associated with a specific storage.

Location is information that indicates where the storage exists. An example of how to uniquely identify a location is by using an ID of a region or a zone. In the case of a storage system that is built across multiple regions and zones, the location field may have multiple values representing the multiple regions and zones. In the case of a storage system that is built across all zones in a certain region, the zone field for the location information may be omitted.

"Accessible from" is information that indicates where the storage corresponding to the entry can be used from. An example of how to specify this field is by using an ID of a region and a zone. In the case of a storage system that can be accessed from multiple regions and zones, the accessible from fields of region and zone may have multiple values. In the case of a storage system that can be accessed from all zones in a certain region, the accessible from fields for the zones may be omitted.

FIG. 7 illustrates an example volume management table 700, in accordance with example implementations. The volume management table 700 stores information involving volume ID, size, and storage ID. The volume ID is identifier information associated with the volumes, and every entry in the volume management table 700 is associated with a specific volume. Size is information that indicates the capacity of the associated volume. Storage ID is information that indicates the storage which owns the volume.

FIG. 8 illustrates an example copy management table 800, in accordance with example implementations. The copy management table 800 stores information involving source information, destination information, method, and status. Every entry in the copy management table 800 is associated with a copy relation.

Source is information about copy source volume. Under source information, ID is an identifier of the copy source volume and owner is identifier of storage which owns the copy source volume. Destination is information about copy destination volume. Under destination information, ID is an identifier of the copy destination volume and owner is identifier of storage which owns the copy destination volume.

Method is information indicating copy method to be used for corresponding copy relation. Sync means synchronous copy, and async means asynchronous copy. Synchronous copy enables data copy without data loss, but is not suitable for copying between distant locations as the communication latency for data copying has large impact on I/O performance. Asynchronous copy can be used for copying between distant locations as the communication latency for data copying has small impact on I/O performance, but is unable to provide zero RPO.

Status is copy status of the corresponding copy relation. If the copy of the entire data of the copy source volume has not been completed and is still in the progress of performing the initial copy, the status indicates a syncing state. If the entire data of the copy source volume has been copied to the copy destination volume and is in a state where it will sequentially copy updated data to the destination volume, the status indicates a synced state. If copy is suspended due to failure of copy source storage, the status indicates a suspension due to failure state. If copy is suspended by users or due to failure of copy destination storage, the status indicates a suspension status.

Figure 9:
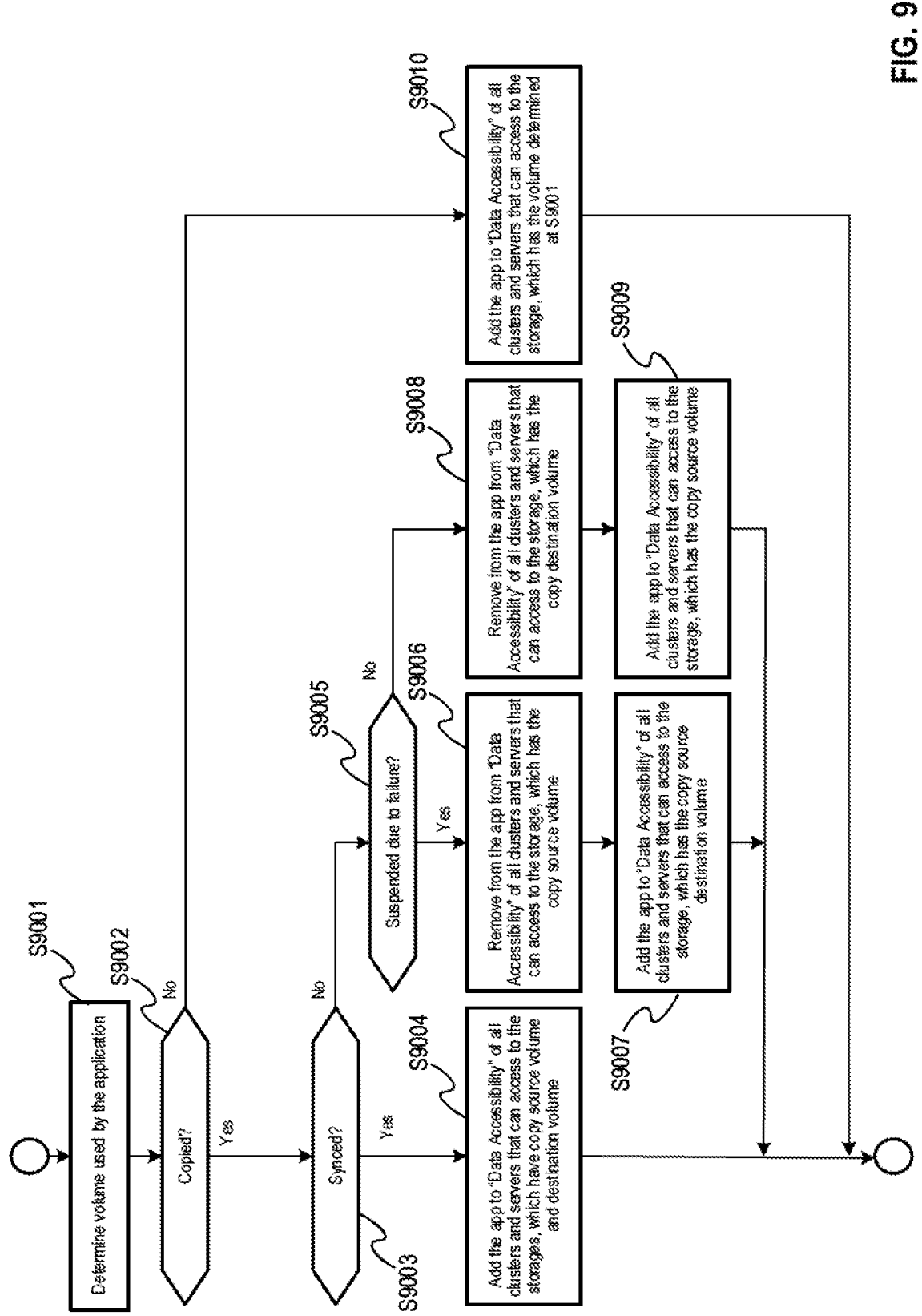
FIG. 9 illustrates an example processing flow for notifying clusters and servers having access to volumes used by application, in accordance with example implementations.

FIG. 9 illustrates an example processing flow for notifying clusters and servers having access to volumes used by application, in accordance with example implementations. The process is executed by the storage agent when an application is instructed to operate by users, when the storage configuration or storage state changes, when new volumes are created for the application, when application configuration is changed, when location of cluster or server is changed, or when there is a change in the clusters or servers that leads to access of storages due to changes in connecting relationships. The process is performed per application and if the process needs to be performed for multiple applications operating in the system, then the process can be repeated for each App ID identified in the application management table 500.

At S9001, the storage agent identifies volumes used by the application. To identify volumes used by the application, the storage agent refers to the volume ID field that corresponds to a specified App ID in the application management table 500. At 9002, the storage agent checks if the volume has multiple copy relation by referring to copy management table 800. If the volume used by the application does not have copy relations at S9002, it is necessary for the application to be deployed on a cluster and server that has access to the volume used by the application. At S9010, the storage agent adds ID of the application to "Data accessibility" fields corresponding to the clusters and servers on which the volume determined at S9001 is available.

If the volume has multiple copy relation, then steps S9003 to S9009 are processed for each copy relation in post-order. Post-order means that later copies are processed before earlier copies in the copy order. For example, in the case of a cascaded copy relation, where the copy destination volume is further copied to other storage, these steps are processed for both copies, one from the original volume and one from the copy destination volume of the original volume. In the case of a fan-out configuration where there are multiple copy relations that are copied directly from the original volume, these steps are also processed for each copy relation.

At S9003, if the copy status indicates that the data is synced to the copy destination volume, the application can use both the copy source volume and copy destination volume. Therefore, at S9004, the storage agent adds ID of the application to "Data accessibility" fields corresponding to the clusters and servers on which either the copy source volume or the copy destination volume is available.

To identify clusters and servers on which the volume is available, first the storage agent identifies the storage that owns the volume by referring to the entry corresponding to the volume in the volume management table 700. Next, the storage agent refers to the entry corresponding to the identified storage in the storage management table 600 and checks where the storage can be used from. Finally, the storage agent refers to the cluster management table 300 and server management table 400 to identify the clusters and servers that exist in the location, from where the identified storage can be used. This procedure of identifying clusters and servers on which the volume is available is also applicable for the steps shown in S9007, S9008, S9009, S9010, and S9011.

At S9003 and S9005, in a cascaded copy configuration, if there are copies in the syncing states in ancestor copies, it is treated as syncing even if the copy in question is in the synced status. This is because the situation implies that there is data that has not yet been copied to the source volume of the copy in question.

At S9005, if the copy status indicates that copy is suspended due to failure, the copy source volume is not available for the application because the storage owning the copy source volume has failed. Therefore, at S9006, the storage agent removes the ID of the application from "data accessibility" fields corresponding to the clusters and servers on which the copy source volume is available. In addition, at S9007, the ID of the application is added to "data accessibility" fields corresponding to the clusters and servers on which the copy destination volume is available. This prevents applications from being deployed on clusters or servers that the copy source volume is available and fail to run due to volume access error caused by storage failures. At this time, for clusters or servers on which both the copy source and destination volumes are available, the storage agent treats them as those on which the destination volume is available.

At S9005, if the copy status indicates that other status such as syncing, manually suspended, and suspension due to failure of storage owning the copy destination volume, then the copy destination volume cannot be used for the application because some data has not yet been copied to the copy destination volume. Therefore, at S9008, the storage agent removes the ID of application from "data accessibility" fields corresponding to the clusters and servers on which the copy destination volume is available. In addition, at S9009, the ID of the application is added to "data accessibility" fields corresponding to the clusters and servers on which the copy source volume. This prevents applications from being deployed on clusters or servers on which the copy destination volume and cause application malfunction due to inconsistent or old data. For cascaded copy configuration, if there are copies in the syncing status in ancestor copies, it is treated as syncing even if the copy in question is synced status. At this time, for clusters or servers on which both the copy source and destination volumes are available, the storage agent treats them as those on which the source volume is available.

FIG. 9 illustrates an example of detecting a storage failure based on a copy condition. However, other methods of detecting storage failures may be used. In some alternative implementations, a system may be used to monitor the operational status of the storages and provides the status of storages. The information provided by the system may then be used for determining storage status.

The foregoing example implementation may have various benefits and advantages. For example, Application scheduling that considers configuration, status of the volumes, and storages used by stateful applications, can be automated so that stateful applications' restart that are required for maintenance and recovery can be automated. By automating the maintenance and recovery required to maintain stability, application operators can perform operations to maintain stability without specialized knowledge, while achieving agility and stability of stateful applications.

Figure 10:
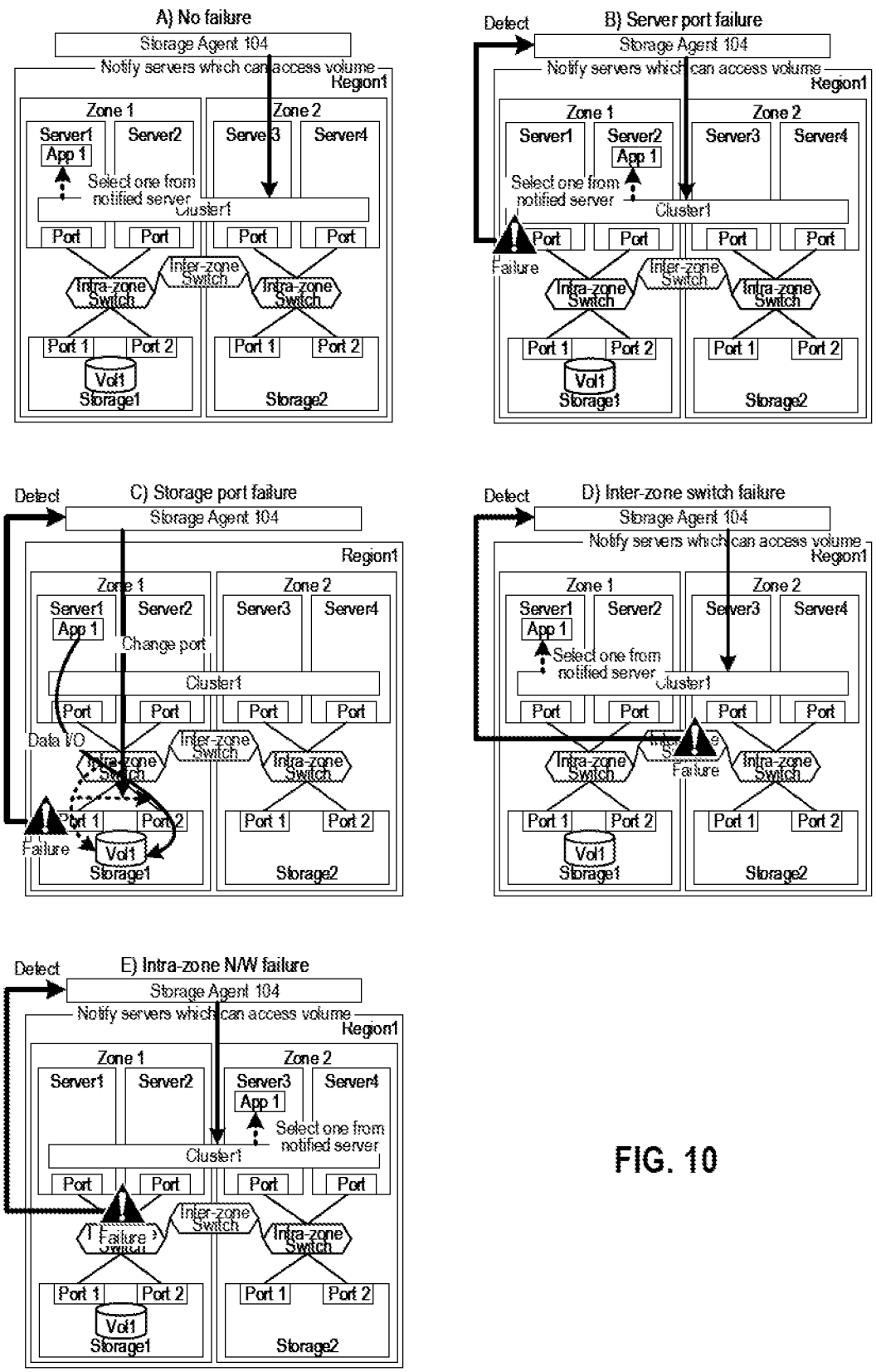
FIG. 10 illustrates an example overview of a second embodiment, in accordance with example implementations.

FIG. 10 illustrates an example overview of a second embodiment, in accordance with example implementations. The first embodiment considers whether a volume used by an application has copy relation or not, whether the storage has failed or not, and the copy state associated with the volume. In addition to these factors, the state of the network connecting the storages and the servers also affects whether the application can access the data. Therefore, the second embodiment shows a method of notifying the application scheduler of servers that can access the data while considering the state of the network between storages and the servers.

There are several patterns of network failures, and the appropriate control method is different for each of the patterns.

a) No Failure

In case of no failure, all servers that are determined to be able to access the volume as result of referencing the volume management table 700, storage management table 600, and server management table 400 can access the volume. Therefore, based on the referencing result, the storage agent 104 notifies the cluster's application scheduler of the servers on which the volume is available.

b) Server Port Failure

If a server cannot communicate with storages due to failure of a network port associated with a server, the server cannot access the volume on storages. Therefore, the storage agent 104 excludes the server having port failure from servers on which the volume used by an application is available.

c) Storage Port Failure

If a server cannot communicate with storages due failure of a network port associated with a storage, communication can be made possible by switching to an alternative network port of the storage to access the volumes. Therefore, the storage agent 104 changes a port of the storage to be used and notifies cluster's application scheduler of the change.

d) Inter-Zone Switch Failure

If a network switch that establishes connections among zones fails, storages cannot be accessed from servers in the different zones. Therefore, the storage agent 104 excludes the server that belongs to a different zone than the storage owning the volume from the servers that are notified as servers which can access the volume used by an application.

e) Intra-Zone Network Failure

Due to failure of a switch connecting devices within a zone, the servers belonging to the same zone as the storage may not be able to access the storage. In this case, the storage agent 104 excludes the server that belong to a same zone as the storage owning the volume from the servers that are notified as servers which can access the volume used by an application.

Figure 11:
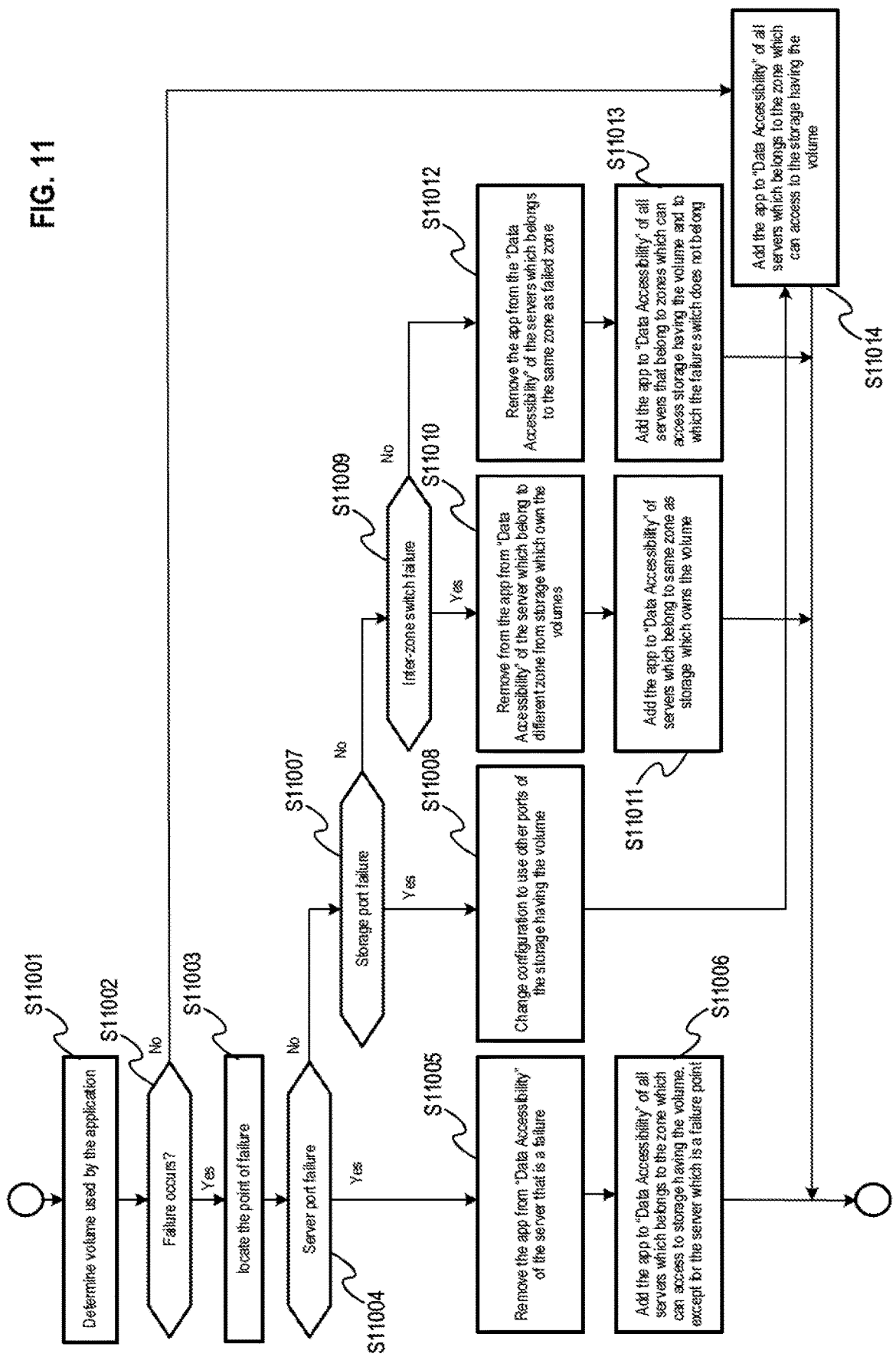
FIG. 11 illustrates an example processing flow of the second embodiment, in accordance with example implementations.

FIG. 11 illustrates an example processing flow of the second embodiment, in accordance with example implementations. As illustrated in FIG. 11, clusters are notified of network failures between connecting servers and storages. The process is executed by storage agent 104 when an application is instructed to operate by users, when the storage configuration or storage status changes, when network configuration between servers and storages is changed, when new volumes are created for an application, when application configuration is changed to not using a volume, and when error at volume access or network failure is detected. The process is performed for a single application at a time. If multiple applications need to be processed in the system, the process can be repeated for each identified application.

At S11001, the storage agent identifies volumes used by the application. To identify volumes used by the application, the storage agent refers to the volume ID field that corresponds to a specified App ID in the application management table 500. At S11002, the storage agent checks to see whether a network failure is detected between servers and storages. This is performed by referring to each server's and storage's communication log, or by referring to each device's operational status collected by the management system of the IT infrastructure or network.

If the determination at S1102 is that there is no failure on network between servers, then the process proceeds to S11014, where all servers that are determined to be able to access the volume as a result of referencing the volume management table 700, storage management table 600, and server management table 400 can access the volume. Therefore, the storage agent adds the ID of the application to "data accessibility" fields corresponding to these servers at S11014.

If the determination at S1102 is that there is a failure on network between servers and storages, then the storage agent locates the point of failure at S11003. At S11004, if the cause of failure is failure of server's network port, then the server having the failure is unable to access the volume on storages. Therefore, the storage agent removes the ID of application from "data accessibility" fields corresponding to the servers having the failure at S11005. At S1106, the storage agent adds ID of the application to "data accessibility" fields corresponding to the servers on which the volume used by the application is available with the exceptions of the server having the failure. This prevents applications from being deployed on the servers which cannot access storage due to port failure.

At S11007, if the cause of failure is failure of storage's network port, then the volume cannot be accessed via the failed port. However, the volume may be accessed via a port different from the failed port. At S1108, the storage agent changes the network port of the storage to be used for accessing the volume. At S11014, the storage agent adds the ID of the application to "data accessibility" fields corresponding to these servers.

At S11009, if the cause of failure is failure of inter-zone network connecting the different zones, then storages having the volume cannot be accessed from servers located in different zones. Therefore, at S11010, the storage agent removes the ID of application from "data accessibility" fields corresponding to the servers belonging to different zones than the storage owning the volume. In addition, at S11011, the storage agent adds ID of the application to "data accessibility" fields corresponding to the servers belonging to the same zone as the storage owing the volume. These steps ensure that the application is placed on one of the servers in the same zone as the storage owning the volume, and not on servers in a zone different from the zone of the storage.

At S1109, if the cause of failure involves a location such as a switch installed in rack of servers or a switch connecting devices in the zone, then storages having the volume may not be accessible from servers in the same zone as the storage owning the volume, but it may be accessible from servers in a zone other than the storage owning the volume. In this case, the storage agent removes the ID of application from "data accessibility" fields corresponding to servers belonging to the same zone as the storage owning the volume at S11012. At S11013, the storage agent adds ID of the application to "data accessibility" fields corresponding to servers belonging to a zone other than the storage owing the volume. These steps can ensure that the application is placed on one of the servers in a different zone from the zone of the storage owning the volume, and not on servers in the same zone as the storage.

Figure 12:
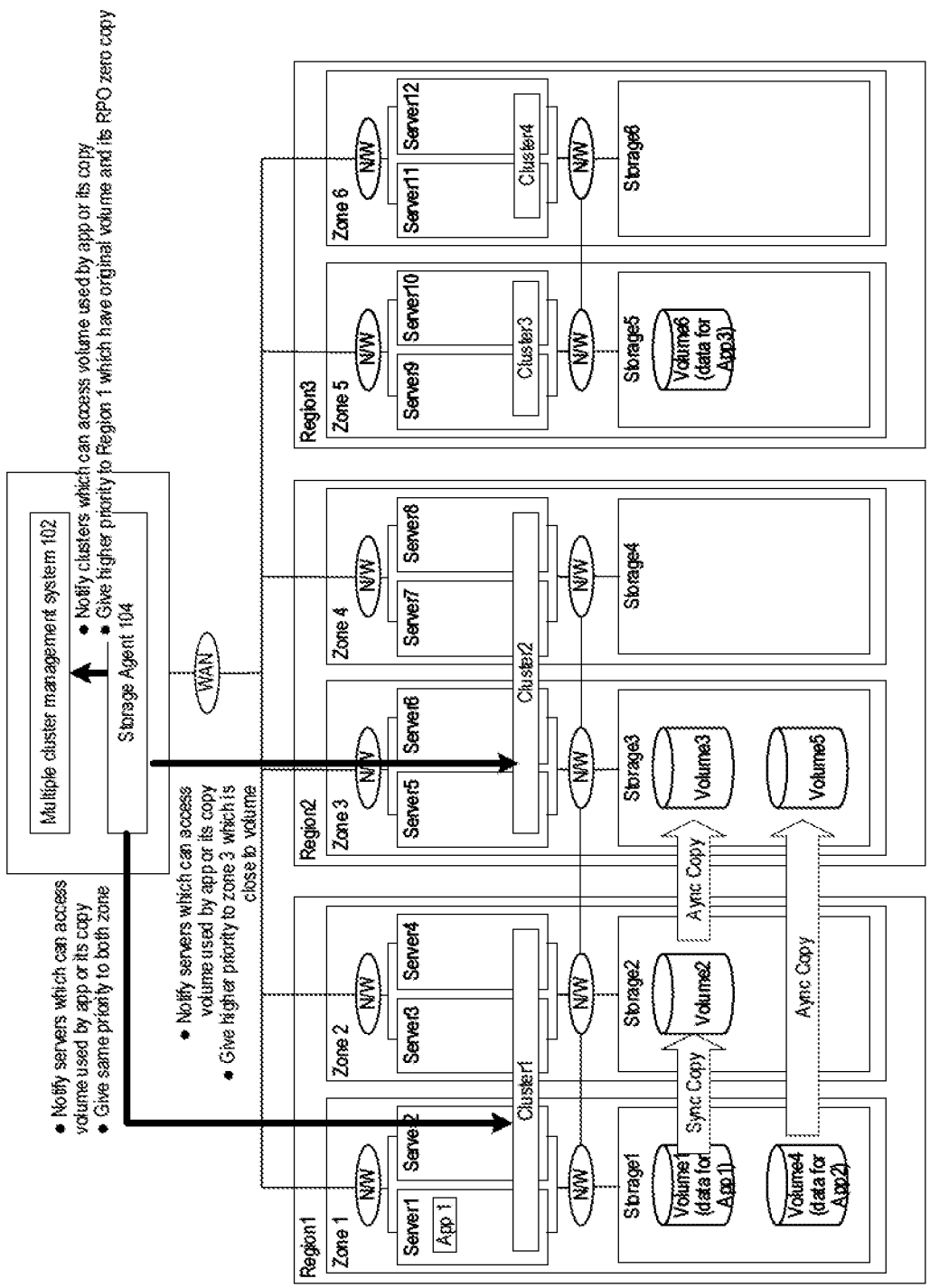
FIG. 12 illustrates an example overview of a third embodiment, in accordance with example implementations.

FIG. 12 illustrates an example overview of a third embodiment, in accordance with example implementations. The third embodiment illustrates a method which prioritizes clusters and servers on which the application data is available based on factors such as data access performance, the nature of the data that can be accessed, and etc. The first and second embodiments treat all clusters and servers on which the application data is available as having the same priority.

However, depending on certain determining factors, it may be desirable to prioritize certain clusters and servers on which the data is available.

In the case of synchronous copy having synced status, there is no difference between the copy source volume and the copy destination volume. Therefore, servers and clusters on which the copy source volume and servers and clusters on which the copy destination volume is available can be treated as having the same priority.

On the other hand, in the case of asynchronous copy, there is no guarantee that all data has been copied to the copy destination volume, and the copy destination volume may be in a slightly older state than the copy source volume even when a synced state is indicated. Therefore, a higher priority is assigned to clusters and servers on which the copy source volume is available than those on which only the copy destination volume is available.

In addition, the access performance to the storage from each cluster or each server may differ due to network configuration such as differences in the number of network switches that are passed through when communicating with the storage possessing the volumes. In this case, higher priority is given to clusters and servers that can access the storage faster in order to improve the processing performance of applications. Generally, servers and clusters that belong to the same zone as the storage can access the storage faster than servers and clusters belonging to different zones. This is based on the idea that IT devices are generally connected to switches that connect devices within a zone first, and switches for intra-zone communication are connected to switches for inter-zone connections. In this configuration, compared to communication within a zone, communication across zones requires a larger number of switches to pass through, resulting in longer latency. In some example implementations, other methods may be used to estimate the storage access performance. For example, a method for measuring access performance to storage on each server or cluster by access testing.

Figure 13:
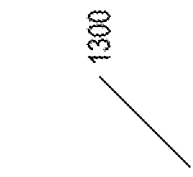
FIG. 13 illustrates an example application placement rule management table for the third embodiment shown in FIG. 12, in accordance with example implementations.

FIG. 13 illustrates an example application placement rule management table 1300 for the third embodiment, in accordance with example implementations. The application placement rule management table 1300 is managed by the multiple cluster management system 102 and cluster to application scheduling. Each entry in the application placement rule management table 1300 is associated with a specific application. The application placement rule management table 1300 stores information involving application ID (App ID), required rule associated with the application, and preferred rule associated with the application.

App ID is an identifier of the application. Required rule is a mandatory condition when selecting a server or cluster. Each entry in the application placement rule management table 1300 has an associated preferred rule. A preferred rule has a pair of condition and weight. Each entry of application placement rule management table may have multiple preferred rules.

For each cluster and server that meets a required rule, the application scheduler computes a sum by iterating through each preferred rule and adding "weight" to the sum if the cluster or server matches the corresponding condition of the preferred rule. After calculating the sum, the application scheduler selects the cluster or server with the highest total weight value for placement. This allows the application to be placed in the most desirable cluster or server.

Figure 14:
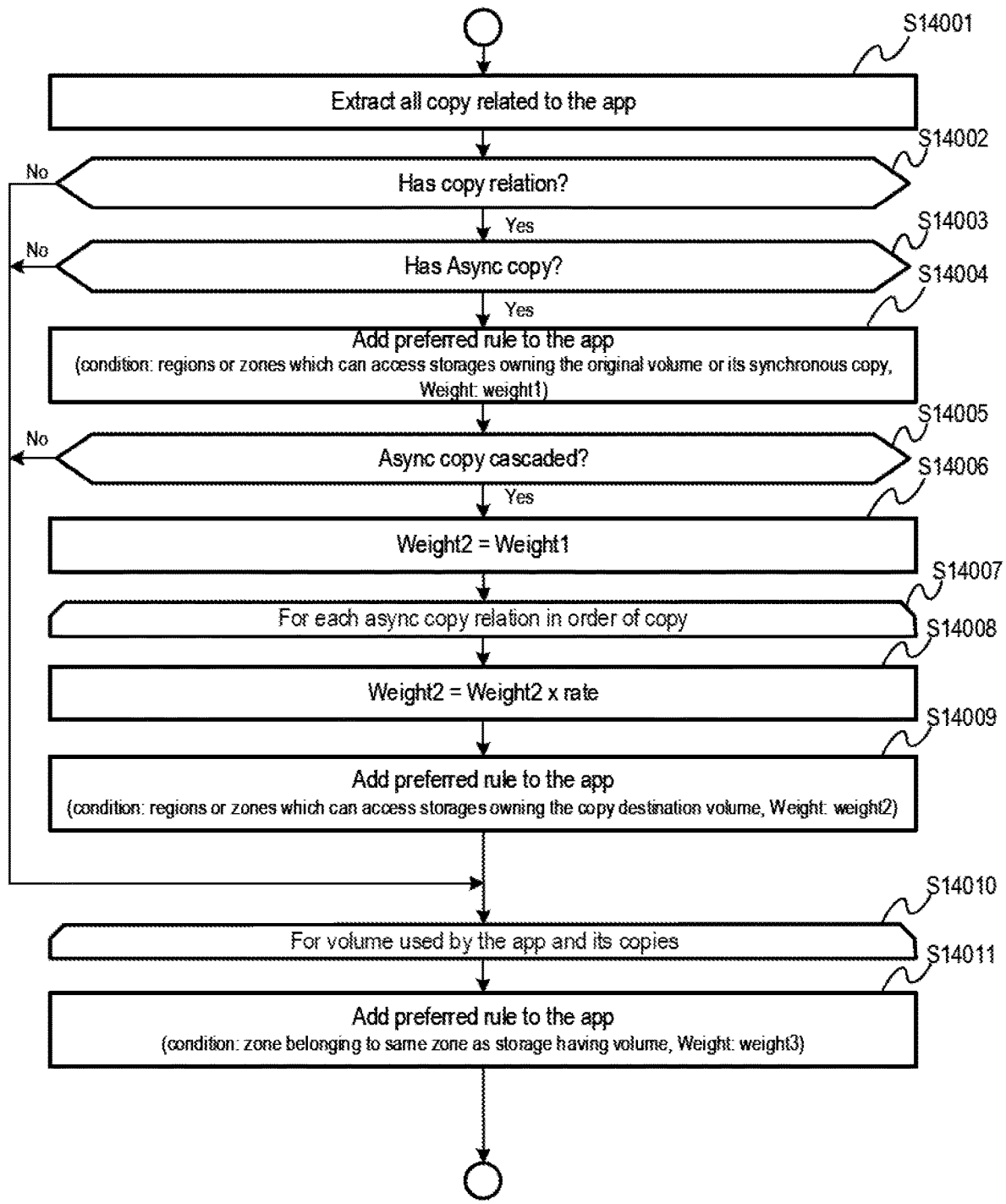
FIG. 14 illustrates an example processing flow to create a preferred rule to prioritize clusters and servers based on the copy configuration and volume access performance, in accordance with example implementations.

FIG. 14 illustrates an example processing flow to create a preferred rule to prioritize clusters and servers based on the copy configuration and volume access performance, in accordance with example implementations.

At S14001, the storage agent extracts all copy relations related to the application. This can be done by identifying volume ID corresponding to the application from application management table 500 and searching copy management table 800 with the identified volume ID. By recursively searching the copy management table 800 using the ID of the copy destination volume of the found copy relationship, all copies related to the application are extracted.

At S14002, it is determined whether any copy relation exists. If the volume used by the application does not have any copy relation, steps S14003 to S14009 are skipped and the process proceeds to S14010. If a copy relation exists for the volume used by the application, then the process proceeds to S14003. At S14003, it is determined whether the copy relation includes asynchronous copying. If the copy relations do not include asynchronous copy, steps from S14003 to S14009 are skipped and the process proceeds to S14010. In the case where only synchronous copy exists, the volumes in the copy relations have the same data, so there is no need to prioritize them.

If the copy relation includes asynchronous copy at S14003, the storage agent adds a preferred rule to the application. At S14004, the condition of the preferred rule to be added is that the server or cluster belongs to region or zone on which either the original volume or its synchronous copy destination volume is available. This allows rule-adding to prioritize volume with less data loss. The weight of the preferred rule to be added at S14004 is weight1, which can be any number. If accessibility to the volume with less data loss is more important than access performance, then weight1 shall be greater than weight3. If access performance is more important than accessibility to the volume with less data loss, then weight1 shall be smaller in value than weight3.

At S14005, if asynchronous copy relations are not cascaded, then the storage agent skips steps S14006 to S14009, and the process proceeds to S14010. If asynchronous copy relations are cascaded at S14005, then the storage agent proceeds to S14006. Steps S14006 to S14009 are processed to add rules to give higher priority to volume having fewer stages of asynchronous copy relations. This means that higher priority is given to the previous volumes in an asynchronous copy order.

At S14006, weight2 is initialized as weight1 for subsequent processing. At S14007, steps S14008 to S14010 are processed for each asynchronous copy relation in order of copy. In order to make the priority of the copy destination volume of the later copy in copy order smaller than the original volume, its synchronous copy, or the copy destination volume of the earlier copy in the copy order, weight2 is multiplied by a number less than 1 to reduce weight2 by a fixed ratio (S14008).

At S14009, the storage agent adds a preferred rule to the application. The condition of the preferred rule to be added at step S14009 is that the server or cluster belongs to the region or zone which can access the storages owning the copy destination volume of the asynchronous copy relation. At S14009, weight is assigned the value of weight2.

Steps S14001 to S14009 are the process of creating preferred rules to use a volume with less data loss by taking the copy relationship into consideration. Whereas steps S14010 to S14011 are the process for creating preferred rules to prioritize servers and clusters that have higher access performance to application data.

At S14010, S14011 is processed for volume used by the application its copies. At S14011, the storage agent adds a preferred rule to the application. The condition of the preferred rule to be added at step S14011 is that the server or cluster belongs to the same zone as a storage owning the original volume used by the application or its copy. The weight of the preferred rule to be added at step S14011 is weight3. Weight3 can be any number. If accessibility to the volume with less data loss is more important than access performance, weight3 shall be smaller in value than weight1 and weight2. If access performance is more important than accessibility to the volume with less data loss, weight3 shall be greater in value than weight1 and weight2.

Figure 15:
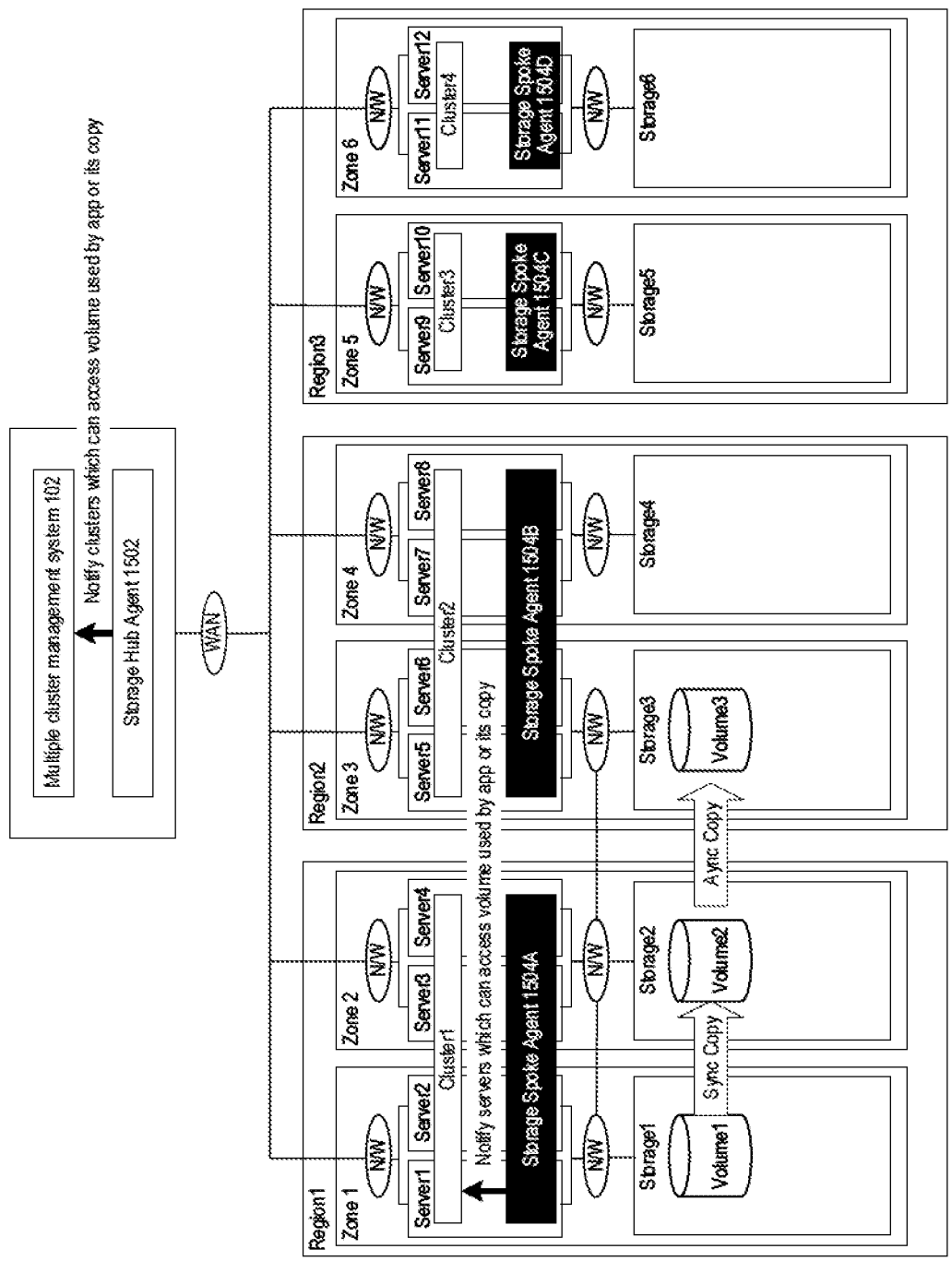
FIG. 15 illustrates an example overview of a fourth embodiment, in accordance with example implementations.

FIG. 15 illustrates an example overview of a fourth embodiment, in accordance with example implementations. The fourth embodiment is a method in which the processing of the storage agent is distributed to a hub and the clusters.

As described for the explanation of FIG. 1, the selection of clusters is done by the multiple cluster management system 102, and the selection of servers is performed by each cluster. When selecting a cluster and server for placement of an application, the multiple cluster management system 102 first selects a cluster. After the selection, the multiple cluster management system 102 requests the selected cluster to run the application and the cluster selects a server from servers belonging to the cluster for the application to run on.

In the fourth embodiment, in the same way, notifications for cluster selection can run in the same location as the multiple cluster management system 102, while notifications for server selection can run within each cluster. As illustrated in FIG. 15, a storage hub agent 1502 takes care of the first processing and the storage spoke agent 1504 takes care of the second processing. In this form, processing is distributed to a hub and the clusters, and can avoid load concentration to the hub. In addition, communication efficiency can be improved for notifying the application scheduler of the cluster because storage spoke agent 1504 and the application scheduler run in same location. As illustrated in FIG. 15, storage spoke agent may be deployed in various configurations such as storage spoke agents 1504A-D.

In this form, the storage hub agent 1502 sets the data accessibility fields for the cluster management table managed 300 managed by the multiple cluster management system 102, and the storage spoke agent 1504 sets the data accessibility for the server management table 400 managed by the cluster where the storage spoke agent 1504 runs. The application placement rule table 200 is maintained both in the multiple cluster management system 102 and each cluster. The storage hub agent 1502 sets the required rule and preferred rule in the application placement rule table 200 of the multiple cluster management system 102. The storage spoke agent 1504 sets the required rule and preferred rule in the application placement rule table 200 of the cluster where the storage spoke agent 1504 runs.

If only a single cluster is being used, then the system can be operated without the multiple cluster management system 102 and the storage hub agent 1502.

Figure 16:
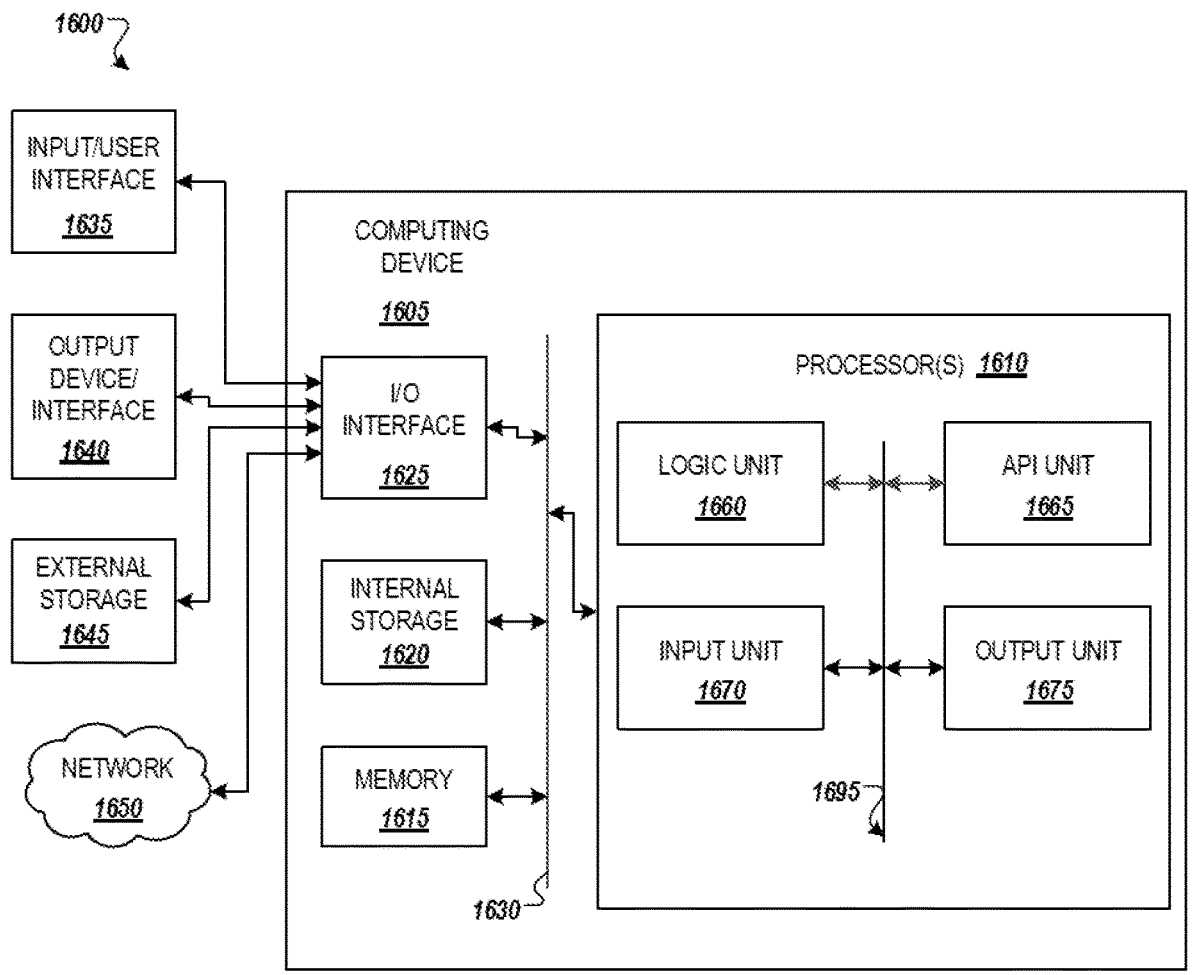
FIG. 16 illustrates an example computing environment with an example computer device suitable for use in some example implementations.

FIG. 16 illustrates an example computing environment with an example computer device suitable for use in some example implementations. Computer device 1605 in computing environment 1600 can include one or more processing units, cores, or processor(s) 1610, memory 1615 (e.g., RAM, ROM, and/or the like), internal storage 1620 (e.g., magnetic, optical, solid-state storage, and/or organic), and/or IO interface 1625, any of which can be coupled on a communication mechanism or bus 1630 for communicating information or embedded in the computer device 1605. IO interface 1625 is also configured to receive images from cameras or provide images to projectors or displays, depending on the desired implementation.

Computer device 1605 can be communicatively coupled to input/user interface 1635 and output device/interface 1640. Either one or both of the input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1640 may include a display, television, monitor, printer, speaker, braille, or the like. In some example implementations, input/user interface 1635 and output device/interface 1640 can be embedded with or physically coupled to the computer device 1605. In other example implementations, other computer devices may function as or provide the functions of input/user interface 1635 and output device/interface 1640 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via IO interface 1625) to external storage 1645 and network 1650 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

IO interface 1625 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computer device 1605 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, the input unit 1670, the output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide an output based on the calculations described in example implementations.

Processor(s) 1610 can be configured to identify, by a storage agent, a first server from a plurality of servers or a first cluster from a plurality of clusters, the first server or the first cluster can access a first volume through which an application can be executed as illustrated in FIGS. 1 and 9. The processor(s) 1610 may also be configured to identify, by the storage agent, data associated with the application, wherein the data is stored in the first volume as illustrated in FIGS. 1 and 9. The processor(s) 1610 may also be configured to identify, by the storage agent, a group of servers from the plurality of servers or a group of clusters from the plurality of clusters having access to the data as illustrated in FIGS. 1 and 9. The processor(s) 1610 may also be configured to update, by the storage agent, data accessibility associated with each server of the group of servers or each cluster of the group of clusters as illustrated in FIGS. 1 and 9. The processor(s) 1610 may also be configured to notify, by the storage agent, the updated data accessibility associated with each server of the group of servers or each cluster of the group of clusters as illustrated in FIGS. 1 and 9.

The processor(s) 1610 may also be configured to obtain, by the storage agent, copy management information associated with the first volume, the copy management information comprises source volume information, destination volume information, and state information of replication, wherein the identifying, by the storage agent, the group of servers from the plurality of servers or the group of clusters from the plurality of clusters having access to the data comprises identifying, by the storage agent, the group of servers from the plurality of servers or the group of clusters from the plurality of clusters based on the destination volume information of the copy management information, the destination volume information indicates a copy of the data stored at the first volume is stored at a group of volumes associated with the group of servers or the group of clusters as illustrated in FIGS. 1 and 9.

The processor(s) 1610 may also be configured to identify, by the storage agent, the application as illustrated in FIG. 5. The processor(s) 1610 may also be configured to identify the first volume from a plurality of volumes as being associated with the application based on application management information, the application management information stores relationships between a plurality of applications and the plurality of volumes as illustrated in FIG. 5.

The processor(s) 1610 may also be configured to detect, by the storage agent, whether a network failure has occurred as illustrated in FIG. 11. The processor(s) 1610 may also be configured to, if network failure is detected, locate, by the storage agent, a point of failure associated with the first volume owned by a first storage as illustrated in FIG. 11. The processor(s) 1610 may also be configured to, if the point of failure relates to failure of a network port related to the first server, remove the application from data accessibility of the first server, and adding the application to data accessibility of all other servers belonging to a zone that the first server belongs to as illustrated in FIG. 11. The processor(s) 1610 may also be configured to, if the point of failure relates to failure of a port of the first storage, change configuration to use other ports of the storage to access the first volume as illustrated in FIG. 11. The processor(s) 1610 may also be configured to, if the point of failure relates to inter-zone network failure of an inter-zone switch of a zone owning the first volume, remove the application from data accessibility of all servers in all zones different from the zone owning the first volume, and adding the application to data accessibility of servers belonging to the zone owning the first volume as illustrated in FIG. 11. The processor(s) 1610 may also be configured to, if the point of failure relates to intra-zone network failure of an intra-zone switch of the zone owning the first volume, remove the application from the data accessibility of servers belonging to the zone owning the first volume, and adding the application to the data accessibility of all servers in all zones different from the zone owning the first volume as illustrated in FIG. 11.

The processor(s) 1610 may also be configured to assign weight values to the group of servers or the group of clusters as illustrated in FIG. 12. The processor(s) 1610 may also be configured to place the application in servers with high weight values among the group of servers or clusters with high weight values among the group of clusters, wherein the copy management information further comprises method information, the method information comprises synchronous copying and asynchronous copying, and the assigning weight values to the group of servers or the group of clusters comprising: if synchronous copying is performed between the first volume and a volume of the group of volumes, same weight is assigned to the first server or the first cluster, and servers or clusters associated with the volume of the group of volumes; and if asynchronous copying is performed between the first volume and a volume of the group of volumes, a higher weight is assigned to the first server or the first cluster than the servers or clusters associated with the volume of the group of volumes as illustrated in FIG. 12.

The processor(s) 1610 may also be configured to assign weight values to the group of servers or the group of clusters as illustrated in FIG. 12. The processor(s) 1610 may also be configured to place the application in servers with high weight values among the group of servers or clusters with high weight values among the group of clusters, wherein the assigning weight values to the group of servers or the group of clusters comprises: if a volume of the group of volumes is located in an identical zone as the first volume, assigning same weight value to the first server or the first cluster, and servers or clusters associated with the volume of the group of volumes; and if a volume of the group of volumes is located in a different zone from the first volume, assigning a higher weight value to the first server or the first cluster than servers or clusters associated with the volume of the group of volumes as illustrated in FIG. 12.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for application placement management, the method comprising:
    identifying, by a storage agent, a first server from a plurality of servers or a first cluster from a plurality of clusters, the first server or the first cluster can access a first volume through which an application can be executed;
    identifying, by the storage agent, data associated with the application, wherein the data is stored in the first volume;
    identifying, by the storage agent, a group of servers from the plurality of servers or a group of clusters from the plurality of clusters having access to the data;
    updating, by the storage agent, data accessibility associated with each server of the group of servers or each cluster of the group of clusters; and
    notifying, by the storage agent, the updated data accessibility associated with each server of the group of servers or each cluster of the group of clusters;
    obtaining, by the storage agent, copy management information associated with the first volume, the copy management information comprises source volume information, destination volume information, and state information of replication, wherein the identifying, by the storage agent, the group of servers from the plurality of servers or the group of clusters from the plurality of clusters having access to the data comprises identifying, by the storage agent, the group of servers from the plurality of servers or the group of clusters from the plurality of clusters based on the destination volume information of the copy management information, the destination volume information indicates a copy of the data stored at the first volume is stored at a group of volumes associated with the group of servers or the group of clusters;
    assigning weight values to the group of servers or the group of clusters; and
    placing the application in servers with high weight values among the group of servers or clusters with high weight values among the group of clusters,
    wherein the assigning weight values to the group of servers or the group of clusters comprises:
        if a volume of the group of volumes is located in an identical zone as the first volume, assigning a same weight value to the first server or the first cluster, and servers or clusters associated with the volume of the group of volumes; and if a volume of the group of volumes is located in a different zone from the first volume, assigning a higher weight value to the first server or the first cluster than servers or clusters associated with the volume of the group of volumes.

2. The method of claim 1, wherein the data is stored in the first volume of a first storage from a storage group and the first volume is replicated in a second volume of a second storage from the storage group; and wherein the identifying, by the storage agent, the group of servers from the plurality of servers or the group of clusters from the plurality of clusters having access to the data comprises identifying the group of servers from the plurality of servers or the group of clusters from the plurality of clusters having access to the first volume or the second volume.

3. The method of claim 2, the state information of replication comprising:

a suspended due to failure state where copying of data from a source volume to a destination volume is suspended due to failure at a source storage associated with the source volume;

a synced state where the data of the source volume has been copied to the destination volume; and a syncing state where the destination volume is synced with the source volume and the copied data at the destination volume is being copied to another volume.

4. The method of claim 3, wherein the updating, by the storage agent, data accessibility associated with each server of the group of servers or each cluster of the group of clusters comprises:

if the state information of replication for the second volume associated with a server of the group of servers or a cluster of the group of clusters is the synced state, adding the application to the data accessibility of the server or the cluster.

5. The method of claim 3, wherein the updating, by the storage agent, data accessibility associated with each server of the group of servers or each cluster of the group of clusters further comprises:

if the state information of replication for the second volume associated with server of the group of servers or a cluster of the group of clusters is suspended due to failure state, adding the application to the data accessibility of the server or the cluster, and removing the application from data accessibility of the first server or the first cluster.

6. The method of claim 3, wherein the updating, by the storage agent, data accessibility associated with each server of the group of servers or each cluster of the group of clusters further comprises:

if the state information of replication for the second volume associated with a server of the group of servers or a cluster of the group of clusters is the syncing state, adding the application to the data accessibility of the server or the cluster, and removing the application from data accessibility of any server or cluster associated with any volume that the copy of the data is being copied to.

7. The method of claim 3, wherein the updating, by the storage agent, data accessibility associated with each server of the group of servers or each cluster of the group of clusters further comprises:

if the first volume does not have replication relation to the second volume, adding the application to all servers and clusters having access to the first storage.

8. The method of claim 1, further comprising:
identifying, by the storage agent, the application; and
identifying the first volume from a plurality of volumes as being associated with the application based on application management information, wherein the application management information stores relationships between a plurality of applications and the plurality of volumes.

9. The method of claim 1, further comprising:
assigning weight values to the group of servers or the group of clusters; and
placing the application in servers with high weight values among the group of servers or clusters with high weight values among the group of clusters,
wherein the copy management information further comprises method information, the method information comprises synchronous copying and asynchronous copying, and the assigning weight values to the group of servers or the group of clusters comprising:

if synchronous copying is performed between the first volume and a volume of the group of volumes, a same weight is assigned to the first server or the first cluster, and servers or clusters associated with the volume of the group of volumes; and if asynchronous copying is performed between the first volume and a volume of the group of volumes, a higher weight is assigned to the first server or the first cluster than the servers or clusters associated with the volume of the group of volumes.

10. The method of claim 1, further comprising:
detecting, by the storage agent, whether a network failure has occurred;
if network failure is detected, locating, by the storage agent, a point of failure associated with the first volume owned by a first storage;
if the point of failure relates to failure of a network port related to the first server, removing the application from data accessibility of the first server, and adding the application to data accessibility of all other servers belonging to a zone that the first server belongs to;
if the point of failure relates to failure of a port of the first storage, changing configuration to use other ports of the storage to access the first volume;
if the point of failure relates to inter-zone network failure of an inter-zone switch of a zone owning the first volume, removing the application from data accessibility of all servers in all zones different from the zone owning the first volume, and adding the application to data accessibility of servers belonging to the zone owning the first volume; and
if the point of failure relates to intra-zone network failure of an intra-zone switch of the zone owning the first volume, removing the application from the data accessibility of servers belonging to the zone owning the first volume, and adding the application to the data accessibility of all servers in all zones different from the zone owning the first volume.

11. A non-transitory computer readable medium, storing instructions for application placement management, the instructions comprising:

identifying, by a storage agent, a first server from a plurality of servers or a first cluster from a plurality of clusters, the first server or the first cluster can access a first volume through which an application can be executed;

identifying, by the storage agent, data associated with the application, wherein the data is stored in the first volume;

identifying, by the storage agent, a group of servers from the plurality of servers or a group of clusters from the plurality of clusters having access to the data;

updating, by the storage agent, data accessibility associated with each server of the group of servers or each cluster of the group of clusters;

notifying, by the storage agent, the updated data accessibility associated with each server of the group of servers or each cluster of the group of clusters;

detecting, by the storage agent, whether a network failure has occurred;

if network failure is detected, locating, by the storage agent, a point of failure associated with the first volume owned by a first storage;

if the point of failure relates to failure of a network port related to the first server, removing the application from data accessibility of the first server, adding the application to data accessibility of all other servers belonging to a zone that the first server belongs to, and placing the application on a server of all other servers belonging to the zone that the first server belongs to;

if the point of failure relates to failure of a port of the first storage, changing configuration to use other ports of the storage to access the first volume;

if the point of failure relates to inter-zone network failure of an inter-zone switch of a zone owning the first volume, removing the application from data accessibility of all servers in all zones different from the zone owning the first volume, adding the application to data accessibility of servers belonging to the zone owning the first volume, and placing the application on a server of the servers belonging to the zone owning the first volume; and if the point of failure relates to intra-zone network failure of an intra-zone switch of the zone owning the first volume, removing the application from the data accessibility of servers belonging to the zone owning the first volume, adding the application to the data accessibility of all servers in all zones different from the zone owning the first volume, and placing the application on a server of all servers in all zones different from the zone owning to the first volume.

12. The non-transitory computer readable medium of claim 11, wherein the data is stored in the first volume of a first storage from a storage group and the first volume is replicated in a second volume of a second storage from the storage group; and wherein the identifying, by the storage agent, the group of servers from the plurality of servers or the group of clusters from the plurality of clusters having access to the data comprises identifying the group of servers from the plurality of servers or the group of clusters from the plurality of clusters having access to the first volume or the second volume.

13. The non-transitory computer readable medium of claim 12, further comprising:

obtaining by the storage agent, copy management information associated with the first volume, the copy management information comprises source volume information, destination volume information, and state information of replication, wherein the identifying, by the storage agent, the group of servers from the plurality of servers or the group of clusters from the plurality of clusters having access to the data comprises identifying, by the storage agent, the group of servers from the plurality of servers or the group of clusters from the plurality of clusters based on the destination volume information of the copy management information, the destination volume information indicates a copy of the data stored at the first volume is stored at a group of volumes associated with the group of servers or the group of clusters.

14. The non-transitory computer readable medium of claim 13, the state information of replication comprising:

a suspended due to failure state where copying of data from a source volume to a destination volume is suspended due to failure at a source storage associated with the source volume;

a synced state where the data of the source volume has been copied to the destination volume; and a syncing state where the destination volume is synced with the source volume and the copied data at the destination volume is being copied to another volume.

15. The non-transitory computer readable medium of claim 14, wherein the updating, by the storage agent, data accessibility associated with each server of the group of servers or each cluster of the group of clusters comprises:

if the state information of replication for the second volume associated with a server of the group of servers or a cluster of the group of clusters is the synced state, adding the application to the data accessibility of the server or the cluster.

16. The non-transitory computer readable medium of claim 14, wherein the updating, by the storage agent, data accessibility associated with each server of the group of servers or each cluster of the group of clusters further comprises:

if the state information of replication for the second volume associated with a server of the group of servers or a cluster of the group of clusters is suspended due to failure state, adding the application to the data accessibility of the server or the cluster, and removing the application from data accessibility of the first server or the first cluster.

17. The non-transitory computer readable medium of claim 14, wherein the updating, by the storage agent, data accessibility associated with each server of the group of servers or each cluster of the group of clusters further comprises:

if the state information of replication for the second volume associated with a server of the group of servers or a cluster of the group of clusters is the syncing state, adding the application to the data accessibility of the server or the cluster, and removing the application from data accessibility of any server or cluster associated with any volume that the copy of the data is being copied to.

18. The non-transitory computer readable medium of claim 14, wherein the updating, by the storage agent, data accessibility associated with each server of the group of servers or each cluster of the group of clusters further comprises:

if the first volume does not have replication relation to the second volume, adding the application to all servers and clusters having access to the first storage.

19. The non-transitory computer readable medium of claim 13, further comprising:

identifying, by the storage agent, the application; and identifying the first volume from a plurality of volumes as being associated with the application based on application management information, wherein the application management information stores relationships between a plurality of applications and the plurality of volumes.

20. The non-transitory computer readable medium of claim 13, further comprising:
assigning weight values to the group of servers or the group of clusters; and
placing the application in servers with high weight values among the group of servers or clusters with high weight values among the group of clusters,
wherein the copy management information further comprises method information, the method information comprises synchronous copying and asynchronous copying, and the assigning weight values to the group of servers or the group of clusters comprising:
if synchronous copying is performed between the first volume and a volume of the group of volumes, a same weight is assigned to the first server or the first cluster, and servers or clusters associated with the volume of the group of volumes; and
if asynchronous copying is performed between the first volume and a volume of the group of volumes, a higher weight is assigned to the first server or the first cluster than the servers or clusters associated with the volume of the group of volumes.

21. The non-transitory computer readable medium of claim 13, further comprising:
assigning weight values to the group of servers or the group of clusters; and
placing the application in servers with high weight values among the group of servers or clusters with high weight values among the group of clusters,
wherein the assigning weight values to the group of servers or the group of clusters comprises:
if a volume of the group of volumes is located in an identical zone as the first volume, assigning a same weight value to the first server or the first cluster, and servers or clusters associated with the volume of the group of volumes; and
if a volume of the group of volumes is located in a different zone from the first volume, assigning a higher weight value to the first server or the first cluster than servers or clusters associated with the volume of the group of volumes.

* * * * *